United States Patent Office 3,522,231
Patented July 28, 1970

3,522,231
ASYMMETRICAL 1:2 CHROMIUM COMPLEX
AZO DYESTUFFS
Otto Bitterlin, Basel, Switzerland, assignor to J. R. Geigy,
A.G., Basel, Switzerland
No Drawing. Filed Nov. 4, 1966, Ser. No. 591,975
Claims priority, application Switzerland, Nov. 22, 1965,
16,053/65
Int. Cl. C09b 45/00, 45/06, 45/16
U.S. Cl. 260—145
9 Claims

ABSTRACT OF THE DISCLOSURE

Asymmetrical 1:2 chromium complex azo dyestuffs composed of a nitrophenylene-azo-naphthylene sulfonic acid monoazo dyestuff moiety or a nitrophenylene sulfonic acid-azo-naphthylene sulfonic acid dyestuff moiety substituted at the naphthylene radical by a phenylsulfonylamino or a lower alkylphenylsulfonylamino radical, and of a monosulfonated naphthylene-azo-naphthylene monoazo dyestuff moiety, and their use for the dyeing of keratin material, particularly leather with good light fastness, excellent penetration and a level, neutral, full, strong grey shade are disclosed.

---

The present invention relates to new chromium-containing azo dyestuffs, processes for their preparation, their use for the dyeing of keratin material, particularly leather, as well as, as industrial product, the material dyed with the new, chromium-containing azo dyestuffs.

It has been found that valuable chromium-containing azo dyestuffs are obtained when an azo dyestuff of Formula I

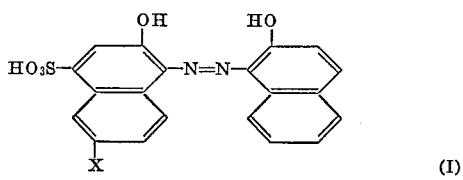

wherein X represents hydrogen or the nitro group, and an azo dyestuff of Formula II

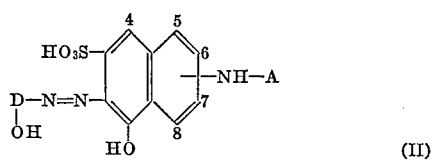

wherein
D represents an optionally sulphonated nitrophenylene radical which contains the hydroxyl group in o-position to the azo bond, and
A represents an acyl radical, are reacted with an agent introducing one atom of trivalent chromium, to form a complex compound of Formula III

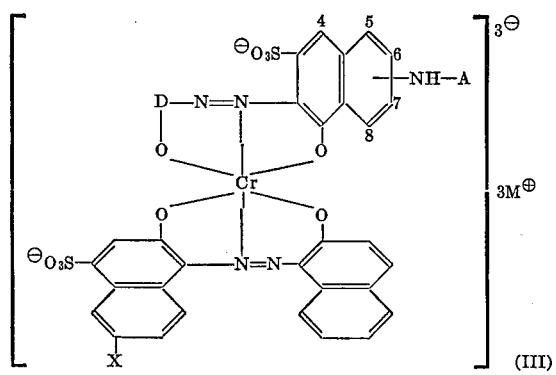

wherein X has the meaning given in Formula I, and D and A have those given in Formula II, and M⊕ represents a cation.

In the compounds of Formulae II and III, the group —NH—A preferably occupies one of the β-positions of the naphthalene ring.

The acyl radical A is derived from both organic carboxylic acids, from carbonic acid and its functional derivatives and also from organic sulphonic acids. It represents, e.g. an aliphatic sulphonyl radical such as the methyl sulphonyl, the chloromethylsulphonyl or the ethyl sulphonyl radical, an aromatic, preferably mononuclear, sulphonyl radical such as the phenylsulphonyl radical, a halogenophenylsulphonyl or a low alkylphenylsulphonyl radical, a preferably low aliphatic carboxylic acid radical such as an unsubstituted alkanoyl radical, e.g. the acetyl or propionyl radical, or a substituted alkanoyl radical such as the chloracetyl, phenoxyacetyl or β-chloropropionyl radical, a cycloaliphatic carboxylic acid radical such as the hexahydrobenzoyl radical, an araliphatic carboxylic acid radical such as the phenylacetyl radical, a preferably mononuclear aromatic carboxylic acid radical such as the benzoyl radical, a chloro- or bromo-benzoyl or a nitrobenzoyl radical; a carbonic acid half ester or carbamoyl radical such as the carbomethoxy, the carbethoxy or the phenylcarbonyl radical.

In preferred chromium-containing azo dyestuffs of Formula III, A represents an arylsulphonyl radical, in particular the phenylsulphonyl or a low alkylphenylsulphonyl radical such as the 4-methylphenylsulphonyl radical, and the group —NH—A occupies the 7-position of the naphthalene ring.

D in Formula II or III is preferably the 4,6-dinitrophenylene or 4-nitrophenylene radical containing the hydroxyl group or the bridging member —O— in the 1-position and the azo bond in the 2-position; D can also represent, however, the correspondingly bound 5-nitrophenylene, 4-nitro-6-sulphophenylene or 6-nitro-4-sulphophenylene radical.

X in Formulae I and III preferably represents the nitro group.

The azo dyestuffs of Formulae I and II which can be used as starting materials are known or can be produced by known methods, e.g. by azo coupling.

As agents introducing trivalent chromium are used, e.g. simple or complex salts of trivalent chromium such as chromic fluoride, acetate, formate or sulphate, or potassium or ammonium chromic sulphate, or water soluble chelate complexes of trivalent chromium, e.g. reaction products of simple chromium (III) salts with polydentate complex forming organic acid such as tartaric, citric, lactic and, principally, salicylic acid. Mainly 1:1 chromium complex compounds of the azo dyestuffs of Formula I or II are used as agents introducing trivalent chromium.

The reaction of the agent introducing one atom of trivalent chromium with the azo dyestuffs of Formulae I and II as defined is preferably performed in aqueous slurry or in aqueous solution, optionally in the presence of an organic solvent. Examples of suitable organic solvents are amides of low fatty acids such as formamide or dimethyl formamide, or alcohols such as low alkanols or alkylene glycols and their low monoalky eithers.

If the azo dyestuffs of Formulae I and II usable as defined are reacted simultaneously with the agent introducing chromium, then advantageously the reaction is performed in the presence of acid binding agents such as sodium or potassium acetate, carbonate or sodium or potassium hydroxide solution, and the dyestuffs are used in about equimolecular amounts.

Preferably, however, the chrome donating agent is reacted first with one of the azo dyestuffs to form the corresponding complex chromium compound containing 1 molecule of this azo dyestuff bound in complex linkage to each chromium atom and then the latter is converted with the other azo dyestuff into the desired 2:1 complex compound of Formula III.

Because of their neutral grey shade, their good water solubility and excellent dyeing properties, mixtures of dyestuffs of the Formulae IV and V

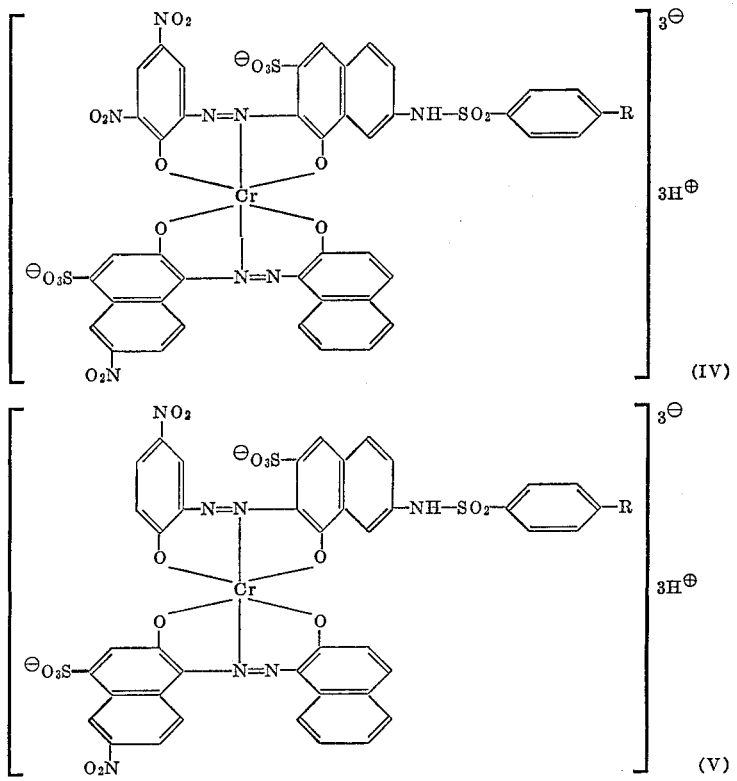

The process is performed particularly advantageously when first one azo dyestuff of Formula I is reacted in aqueous-acid medium at temperatures of about 90 to 110° C. to form the 1:1 chromium complex compound and the equivalent amount of azo dyestuff of Formula II is added thereto to form the chromium complex of Formula III, optionally also a mixture of such azo dyestuffs is added to a mixture of this type of compounds. This addition is made, advantageously at a raised temperature in aqueous medium and in the presence of acid binding agents such as sodium or potassium acetate carbonate or dilute sodium or potassium hydroxide solution.

The new, chromium-containing azo dyestuffs of Formula III are dark powders. In the form of their alkali metal salts they have very good water solubility and are particularly suitable for the dyeing of leather such as chrome tanned suede or grain leather. Mixtures of chromium-containing dyestuffs according to the invention are particularly advantageous.

or the sodium or potassium salts or mixtures of the two salts of these colour acids, in molar ratio of about 3:1 to 1:3, are particularly valuable. In the above Formulae IV and V, R represents hydrogen or the methyl group.

The leather is dyed in the usual way in acid, particularly formic acid, aqueous dye liquor, while vigorously circulating the goods.

Leather dyeings attained with the chromium-containing azo dyestuffs of Formula III according to the invention, in particular with the mixtures of dyestuffs described, are distinguished by good fastness to light, excellent penetration of the leather and also by a level, neutral, full, strong grey shade which alters only inconsiderably on buffing suede leather.

The dyestuffs according to the present invention dye leather, independent of how it was tanned, always in the same shade.

The following examples illustrate the invention. The temperatures are given therein in degrees centigrade.

EXAMPLE 1

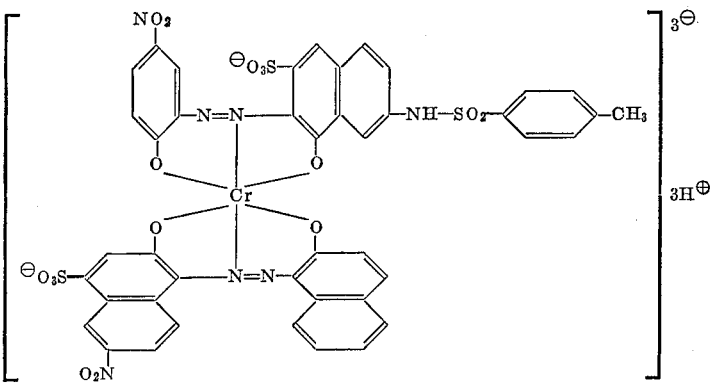

45.3 g. of the monoazo dyestuff obtained by coupling diazotised 6 - nitro - 1 - amino-2-hydroxynaphthalene-4-sulphonic acid with 2-hydroxynaphthalene are suspended in 410 ml. of water at room temperature and then 31.0 g. of chromium acetate (chromium content 20.7%) and 22.0 g. of 85% formic acid are added. The suspension is slowly brought to the boil and it is stirred overnight at this temperature. After another 22.0 g. of 85% formic acid have been added to the reaction mixture, the mixture is stirred for a further 12 hours under reflux. The precipitated 1:1 chromium complex is then filtered off while still warm and is added to the suspension of 55.8 g. of the monoazo dyestuff obtained by coupling diazotised 4 - nitro - 2 - amino-1-hydroxybenzene with 7-(4'-methylphenylsulphonylamino) - 1 - hydroxynaphthalene-3-sulphonic acid, in 500 ml. of water. 1 N sodium hydroxide solution is added until the pH is 5.5 whereupon the mixture is stirred for 15 hours at about 80°. The dyestuff is then salted out with a mixture of sodium and potassium chloride and filtered off. The dyestuff obtained as a mixture of the sodium and potassium salts of the colour acid of the above formula is a dark grey powder which dissolves in water with a reddish grey and in concentrated sulphuric acid with a violet colour. The dyestuff dyes chrome suede (calf) and chrome grain leather in level, reddish grey shades which have good fastness to light and buffing.

If, instead of the 45.3 g. of 6-nitro-1-amino-2-hydroxynaphthalene-4-sulfonic acid→2-hydroxynaphthalene, equimolar amounts of one of the monoazo dyestuffs given in column II of the following Table I are used and, instead of the 55.8 g. of 4-nitro-2-amino-1-hydroxybenzene→7-(4'-methylphenyl-sulphonylamino) - 1 - hydroxynaphthalene-3-sulfonic acid, equimolar amounts of one of the monoazo dyestuffs given in column III of the same table are used and otherwise the procedure described in Example 1 is followed, then corresponding 2:1 chromium complexes are obtained which dye leather in grey shades having similar properties.

EXAMPLE 10

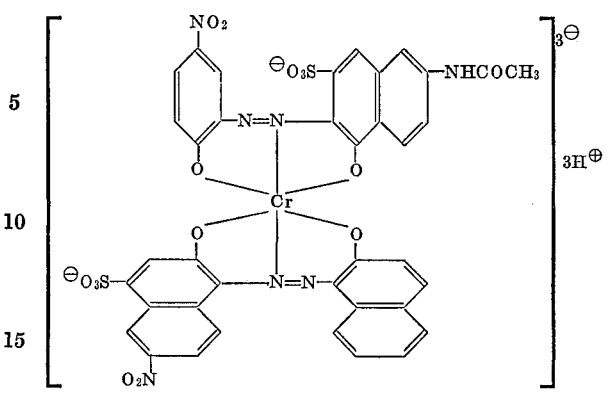

48.9 g. of the 1:1 chromium complex of the monoazo dyestuff 6-nitro-1-amino - 2 - hydroxynaphthalene-4-sulphonic acid→2-hydroxynaphthalene, produced as described in Example 1 are slurried with 44.6 g. of the monoazo dyestuff 4-nitro-2-amino-1-hydroxybenzene→6-acetylamino - 1 - hydroxynaphthalene-3-sulphonic acid in 500 ml. of water. By the processing steps described in Example 1, a mixture of the sodium and potassium salts of the colour acid of the above formula is obtained as a black powder which dissolves in water with a reddish grey and in concentrated sulphuric acid with a violet colour.

Chrome suede (calf) or chrome grain leather is dyed with this product in level reddish grey shades which have good fastness to buffing and light.

If instead of the 48.9 g. of the 1:1 chromium complex given above, the equimolar amount of one of the 1:1 chromium complexes given in column II of the following Table II is used and, instead of the 44.6 of the monoazo dyestuff given above, the equimolar amount of one of the monoazo dyestuffs given in Column III of the same table is used and otherwise the procedure given in

TABLE I

| No. | Monoazo dyestuff of Formula I | Monoazo dyestuff of Formula II |
|---|---|---|
| 2 | 6-nitro-1-amino-2-hydroxynaphthalene-4-sulphonic acid→2-hydroxynaphthalene. | 4-nitro-2-amino-1-hydroxybenzene→7-phenylsulphonylamino-1-hydroxynaphthalene-3-sulphonic acid. |
| 3 | do | 4,6-dinitro-2-amino-1-hydroxybenzene→7-phenylsulphonylamino-1-hydroxynaphthalene-3-sulphonic acid. |
| 4 | do | 4,6-dinitro-2-amino-1-hydroxybenzene→7-(4'-methylphenylsulphonylamino)-1-hydroxynaphthalene-3-sulphonic acid. |
| 5 | do | 4-nitro-2-amino-1-hydroxybenzene-6-sulphonic acid→6-(4'-methylphenylsulphonylamino)-1-hydroxynaphthalene-3-sulphonic acid. |
| 6 | do | 6-nitro-2-amino-1-hydroxybenzene-4-sulphonic acid→6-(4'-methylphenylsulphonylamino)-1-hydroxyhathalene-3-sulphonic acid. |
| 7 | do | 5-nitro-2-amino-1-hydroxybenzene→7-ethylsulphonylamino-1-hydroxynaphthalene-3-sulphonic acid. |
| 8 | do | 4,6-dinitro-2-amino-1-hydroxybenzene→7-methylsulphonylamino-1-hydroxynaphthalene-3-sulphonic acid. |
| 9 | 1-amino-2-hydroxynaphthalene-4-sulphonic acid→2-hydroxynaphthalene. | 4,6-dinitro-2-amino-1-hydroxybenzene→7-(4'-methylphenylsulphonylamino)-1-hydroxynaphthalene-3-sulphonic acid. | the example is followed, then corresponding 2:1 chromium complex dyestuffs are obtained which also dye leather in grey shades having similar properties.

TABLE II

| No. | 1:1 chromium complex of— | Monoazo dyestuff of Formula II |
|---|---|---|
| 11 | 6-nitro-1-amino-2-hydroxynaphthalene-4-sulphonic acid→2-hydroxynaphthalene. | 4-nitro-2-amino-1-hydroxybenzene→7-acetylamino-1-hydroxynaphthalene-3-sulphonic acid. |
| 12 | do | 4-nitro-2-amino-1-hydroxybenzene-6-sulphonic acid→7-benzoylamino-1-hydroxynaphthalene-3-sulphonic acid. |
| 13 | do | 6-nitro-2-amino-1-hydroxybenzene-4-sulphonic acid→6-benzoylamino-1-hydroxynaphthalene-3-sulphonic acid. |
| 14 | do | 5-nitor-2-amino-1-hydroxybenzene→7-carbomethoxyamino-1-hydroxynaphthalene-3-sulphonic acid. |
| 15 | do | 4,6-dinitro-2-amino-1-hydroxybenzene→6-carbethoxyamino-1-hydroxynaphthalene-3-sulphonic acid. |
| 16 | do | 4,6-dinitro-2-amino-1-hydroxybenzene→7-acetylamino-1-hydroxynaphthalene-3-sulphonic acid. |
| 17 | 1-amino-2-hydroxynaphthalene-4-sulphonic acid→2-hydroxynaphthalene. | 4,6-dinitro-2-amino-1-hydroxybenzene→7-carbomethoxyamino-1-hydroxynaphthalene-3-sulphonic acid. |
| 18 | do | 6-nitro-2-amino-1-hydroxybenzene-4-sulphonic acid→7-(3'-nitrobenzoylamino)-1-hydroxynaphthalene-3-sulphonic acid. |

EXAMPLE 19

Mixture of

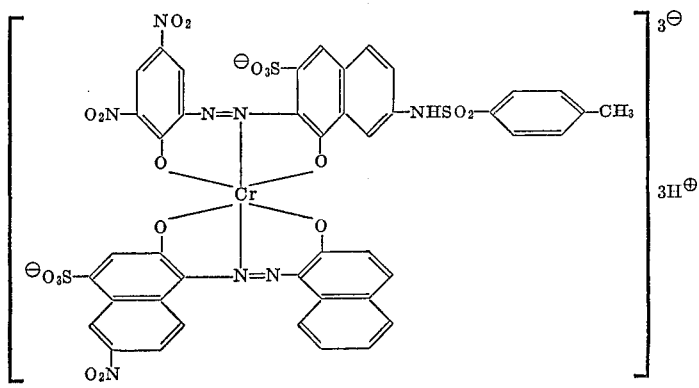

and

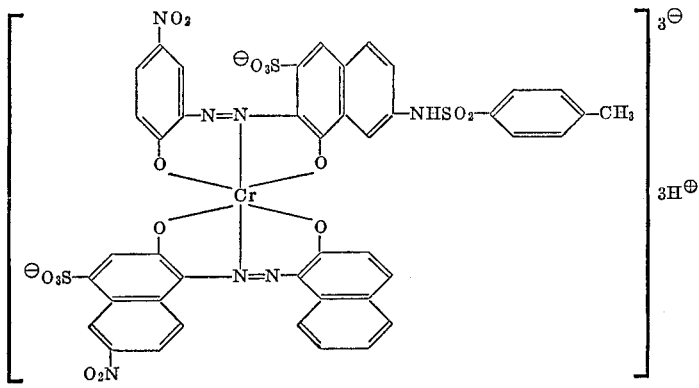

in molar ratio of 1:1.

48.9 g. of the 1:1 chromium complex of the monoazo dyestuff 6-nitro-1-amino - 2 - hydroxynaphthalene-4-sulphonic acid→2-hydroxynaphthalene (obtained according to Example 1), 30.2 g. of the monoazo dyestuff 4,6-dinitro-2-amino-1-hydroxybenzene→7-(4'-methylphenylsulphonylamino)-1-hydroxynaphthalene - 3 - sulphonic acid and 27.9 g. of the monoazo dyestuff 4-nitro-2-amino-1-hydroxybenzene→7-(4' - methylphenylsulphonylamino)-1-hydroxynaphthalene-3-sulphonic acid are suspended in 550 ml. of water. Under the conditions given in Example 1, a mixture of the sodium and potassium salts of colour acids of the above formulae are obtained. This mixture is in the form of a black powder which dissolves in water with a grey and in concentrated sulphuric acid with a violet-grey shade. The product dyes chrome suede (calf) and chrome grain leather in level, neutral shades which are fast to buffing and light.

The dyestuff mixture mentioned can also be produced by separating the sodium or potassium salts of the chromium-containing colour acids of the above formulae and dissolving them in the desired molecular ratio in water and then salting out with sodium and potassium chloride.

The above mixture can also be obtained by simply mechanically mixing the chromium-containing dyestuff components mentioned, e.g. using the apparatus suitable for this purpose such as ball mills etc.

If, instead of the 48.9 g. of the 1:1 chromium complex dyestuff mentioned, one of the 1:1 chromium complex dyestuffs given in column II of the following Table III is used and, instead of the 30.2 g. of monoazo dyestuff 4,6 - dinitro - 2-amino-1-hydroxynaphthalene-3-sulphonic acid, a monoazo dyestuff given in column III of the same table is used, also if instead of the 27.9 g. of monoazo dyestuff 4-nitro-2-amino-1-hydroxybenzene→ 7 - (4' - methylphenylsulphonylamino)-1-hydroxynaphthalene-3-sulphonic acid, one of the monoazo dyestuffs given in column III is used, in all cases in the amounts given in the table, and otherwise the procedure given in the example is followed, then mixtures of the corresponding 2:1 chromium complex dyestuffs are obtained which dye leather in grey shades having similar properties.

TABLE III

| I | II | III |
|---|---|---|
| No. | 1:1 chromium complex | Mixture of monoazo dyestuffs of Formula II |
| 20 | 48.9 g.(0.1 mol) 1:1 chromium complex of 6-nitro-1-amino-2-hydroxynaphthalene-6-sulphonic acid→2-hydroxynaphthalene. | 15.1 g.(0.025 mol) 4,6-dinitro-2-amino-1-hydroxybenzene→7-(4'-methylphenysulphonylamino)-1-hydroxynaphthalene-3-sulphonic acid, and 41.8 g.(0.075 mol) 4-nitro-2-amino-1-hydroxybenzene→7-(4' methylphenylsulphonylamino)-1-hydroxynaphthalene-3-sulphonic acid. |
| 21 | do | 45.3 g. (0.075 mol) 4,6-dinitro-2-amino-1-hydroxybenzene→7-(4'-methylphenylsulphonylamino)-1-hydroxynaphthalene-3-sulphonic acid, and 14.0 g. (0.025 mol) 4-nitro-2-amino-1-hydroxybenzene→7-(4'-methylphenylsulphonylamino)-1-hydroxynaphthalene-3-sulphonic acid. |
| 22 | do | 29.5 g. (0.05 mol) 4,6-dinitro-2-amino-1-hydroxybenzene→7-phenylsulphonylamino-1-hydroxynaphthalene-3-sulphonic acid, and 27.2 g. (0.05 mol) 4-nitro-2-amino-1-hydroxybenzene→7-phenylsulphonylamino-1-hydroxynaphthalene-3-sulphonic acid. |
| 23 | 44.4 g. (0.1 mol) 1:1 chromium complex of 1-amino-2-hydroxynaphthalene-6-sulphonic acid→2-hydroxynaphthalene. | 30.2 g. (0.05 mol) 4,6-dinitro-2-amino-1-hydroxybenzene→7-(4'-methylphenylsulphonylamino)-1-hydroxynaphthalene-3-sulphonic acid, and 27.9 g. (0.05 mol) 4-nitro-2-amino-1-hydroxybenzene→7-(4'-methylphenylsulphonylamino)-1-hydroxynaphthalene-3-sulphonic acid. |

EXAMPLE 24

100 g. of dried, buffed chrome suede (calf) are moistened again in the usual manner in a rotating vat for 2 hours, quickly rinsed and then pre-treated with 1000 ml. of a 50° warm 2% aqueous ammonia solution for 10 minutes. 70 ml. of a 50° warm aqueous solution of 0.5 g. of the dyestuff mixture according to Example 19, paragraph 1, in 210 ml. of water are poured into this pre-treatment solution through the hollow axis of the rotating vat. The vat is rotated for 10 minutes and then a further 70 ml. of the above dyestuff solution are added to the dye bath. After another 20 minutes, the remaining 70 ml. of the above dyestuff solution are added to the dye bath and, after rotating the vat for another 20 minutes, 10 ml. of 8.5% formic acid are added. The vat is then again rotated for 30 minutes, the leather is then rinsed and dried.

The level, neutral, grey dyeing obtained in this way has good overall fastness properties. The leather is well penetrated and, due to the good fastness to buffing, the shade is only inconsiderably altered on later buffing the dried leather.

Similar results are obtained with a mixture of chromium-containing azo dyestuffs according to Examples 20 to 22 instead of the mixture used above with otherwise the same procedure.

If, instead of the dyestuff mixture, a uniform dyestuff according to Examples 1 to 18 is used then, with otherwise the same procedure as described in this example, somewhat more reddish or greenish grey shades are obtained.

EXAMPLE 25

100 g. of shaved chrome grain leather are treated in a rotating vat in 250 ml. of 50° warm water to which are added 20 ml. of a 50° warm aqueous solution containing 0.1 g. of the dye preparation according to Example 24. The dye vat is rotated for 5 minutes and a further 20 ml. of an aqueous dyestuff solution containing 0.1 g. of this dye preparation are added thereto through the hollow axis. After the vat has rotated another 15 minutes, 0.2 ml. of 8.5% formic acid are added to the dye bath, again through the hollow axis, and the vat is rotated for another 20 minutes at 50°. Finally, the dyed leather is rinsed and fat liquored in the usual way in a fresh bath.

Even with this 0.5% dyeing, a full grey shade is attained on chrome tanned grain leather.

Similar results are obtained if, instead of the dyestuff mixture used above, one according to Examples 20 to 23 is used and otherwise the procedure given in this example is followed.

If, instead of the dyestuff mixture mentioned, a uniform dyestuff according to Examples 1 to 18 is used in the method described above, then somewhat more reddish or greenish grey shades are obtained.

What is claimed is:

1. A chromium-containing azo dyestuff of the formula

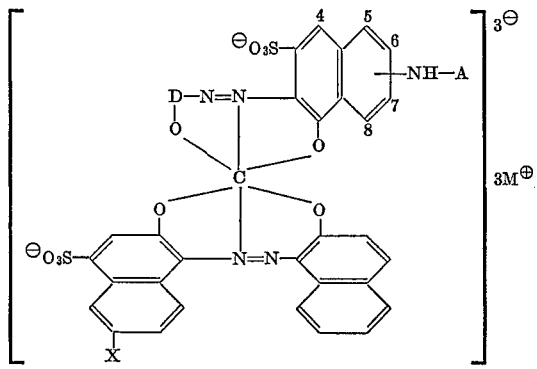

wherein
X represents hydrogen or nitro,
D represents nitrophenylene or sulfonated nitrophenylene which contain the bridging member —O— in 0-position to the azo bond,
A represents phenylsulfonyl or lower alkylphenylsulfonyl (having 1 or 2 carbon atoms in the alkyl radical), and M⊕ represents a cation.

2. A chromium-containing azo dyestuff of thee formula

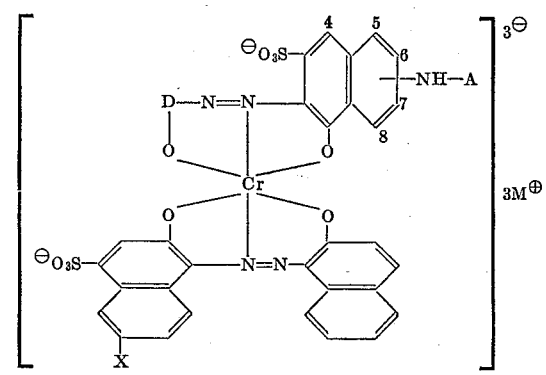

wherein
X represents nitro;
D represents 4,6-dinitrophenylene, 4-nitrophenylene, 5-nitrophenylene, 4-nitro-6-sulfophenylene, or 6-nitro-4-sulfophenylene, all of which contain the bridging member —O— in 1-position and the azo bond in 2-position;
A represents phenylsulfonyl or lower alkylphenylsulfonyl;
M represents sodium or potassium.

3. A chromium-containing azo dyestuff as defined in claim 1 wherein X is nitro, D is 4-nitrophenylene, A is 4-methylphenylsulfonyl, and M is sodium.

4. A chromium-containing azo dyestuff as defined in claim 1 wherein X is nitro, D is 4-nitrophenylene, A is 4-methylphenylsulfonyl, and M is potassium.

5. A chromium-containing azo dyestuff as defined in claim 1 wherein X is nitro, D is 4,6-dinitrophenylene, A is 4-methylphenylsulfonyl, and M is sodium.

6. A chromium-containing azo dyestuff as defined in claim 1 wherein X is nitro, D is 4,6-dinitrophenylene, A is 4-methylphenylsulfonyl, and M is potassium.

7. A chromium-containing azo dyestuff as defined in claim 1 wherein X is nitro, D is 4,6-dinitrophenylene, A is 4-methylphenylsulfonyl whereby the 4-methylphenylsulfonylamino group is located in 7-position, and M is sodium and potassium.

8. A mixture of chromium-containing azo dyestuffs of the formulas

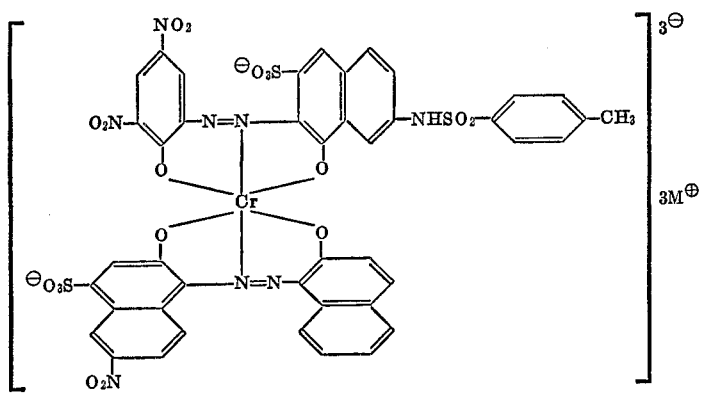
and
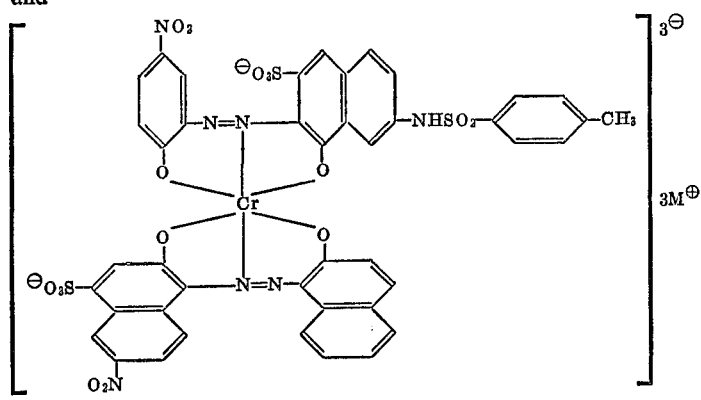
wherein M is sodium and potassium in a molar ratio of 1:2 to 2:1.
9. A mixture of chromium-containing azo dyestuffs of the formulas
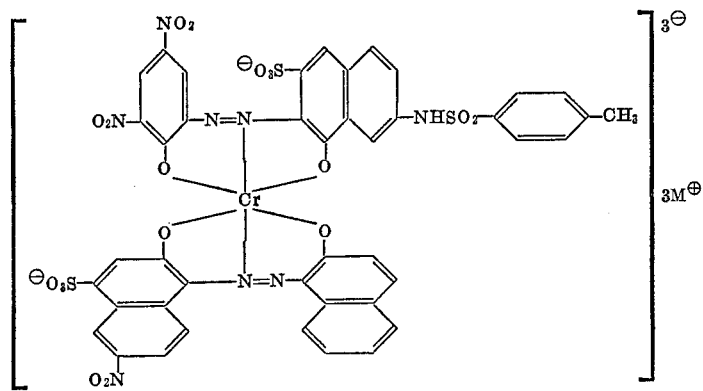
and
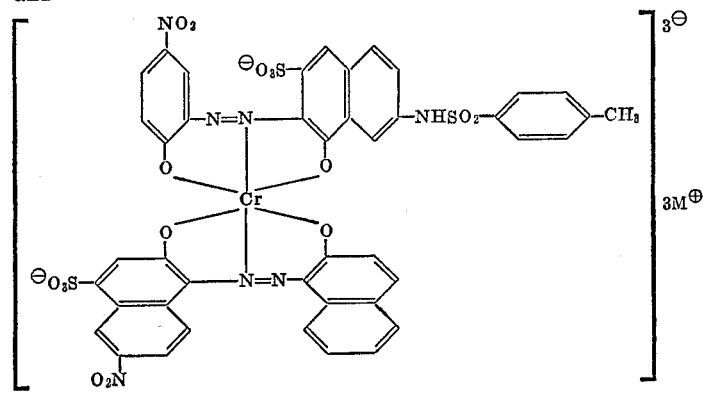

wherein M is sodium and potassium, in a molar ratio of 1:1.

References Cited
UNITED STATES PATENTS

| | | | |
|---|---|---|---|
| 1,887,602 | 11/1932 | Starub et al. | 260—145 |
| 2,012,779 | 8/1935 | Straub et al. | 260—145 |
| 2,610,175 | 9/1952 | Widmer et al. | 260—145 |
| 2,766,230 | 10/1956 | Buehler et al. | 260—145 |
| 2,806,760 | 9/1957 | Brassel et al. | 8—42 |
| 2,906,746 | 9/1959 | Brassel et al. | 260—145 |
| 3,041,327 | 6/1962 | Buehler et al. | 260—145 |
| 3,308,114 | 3/1967 | Blackhall | 260—145 |
| 3,372,155 | 3/1968 | Dittmar et al. | 260—145 |

FLOYD D. HIGEL, Primary Examiner

U.S. Cl. X.R.

8—13; 117—142; 260—150, 151, 195, 198, 199